(12) United States Patent
Valentine

(10) Patent No.: US 6,971,826 B2
(45) Date of Patent: Dec. 6, 2005

(54) TROLLEY AND CHOCK ASSEMBLY

(75) Inventor: Heath E. Valentine, Middletown, OH (US)

(73) Assignee: Valentine and Company, Middletown, OH (US)

( * ) Notice: Subject to any disclaimer, the term of this patent is extended or adjusted under 35 U.S.C. 154(b) by 0 days.

(21) Appl. No.: 10/744,767

(22) Filed: Dec. 23, 2003

(65) Prior Publication Data

US 2005/0135895 A1 Jun. 23, 2005

(51) Int. Cl.$^7$ ................................................ B60P 7/12
(52) U.S. Cl. ........................... 410/50; 410/42; 410/104
(58) Field of Search ............................... 410/31, 47, 49, 410/50, 94, 97, 101, 102, 104, 105, 115, 116, 410/121, 34, 36, 37, 42; 24/265 CD; 248/499

(56) References Cited

U.S. PATENT DOCUMENTS

| | | | |
|---|---|---|---|
| 3,299,989 A | * | 1/1967 | Santosuosso ................. 410/42 |
| 4,102,274 A | * | 7/1978 | Feary et al. .................. 410/50 |
| 4,200,046 A | * | 4/1980 | Koliba et al. ................. 410/94 |
| 4,217,831 A | * | 8/1980 | Koliba et al. ................ 410/121 |
| 4,376,522 A | * | 3/1983 | Banks ...................... 248/503.1 |
| 4,396,175 A | * | 8/1983 | Long et al. ............... 248/503.1 |
| 4,449,875 A | * | 5/1984 | Brunelle ....................... 410/80 |
| 4,469,261 A | * | 9/1984 | Stapleton et al. ........... 224/321 |
| 4,500,020 A | * | 2/1985 | Rasor ......................... 224/321 |
| 4,955,771 A | * | 9/1990 | Bott ............................ 410/94 |
| 5,076,745 A | * | 12/1991 | Klein .......................... 410/94 |
| 5,137,405 A | * | 8/1992 | Klein .......................... 410/94 |
| 6,099,220 A | * | 8/2000 | Poth ........................... 410/94 |

OTHER PUBLICATIONS

Three-dimensional rendering of chock and trolley assembly (color images, 2 copies) (1980).

* cited by examiner

Primary Examiner—H. Gutman
(74) Attorney, Agent, or Firm—Thompson Hine LLP

(57) ABSTRACT

A trolley and chock assembly includes a trolley and a chock shaped to be slidably coupled to the trolley such that the chock can slide in a sliding direction along the trolley. The chock includes a side opening on a side surface thereof. The trolley and chock assembly further includes an attachment mechanism for releasably coupling the chock to the trolley, and the side opening of the chock provides access to the attachment mechanism in a direction generally perpendicular to the sliding direction.

73 Claims, 12 Drawing Sheets

TROLLEY AND CHOCK ASSEMBLY

The present invention is directed to a trolley and chock assembly, and more particularly, to a trolley and chock assembly wherein the chock is slidably mounted on, and releasably attachable to, the trolley.

BACKGROUND

Trolley and chock assemblies are widely used for multiple configuration storage assemblies. For example, in one embodiment, trolley and chock assemblies may be used to store generally components such as bombs, munitions, missiles and the like thereon. However, existing trolley and chock assemblies may be difficult to access and operate, and the chock may not be consistently slidable along the trolley. Furthermore, existing trolley and chock assemblies may include protruding parts or components upon which a wearer's clothing or other loose items may become snagged. Finally, existing trolley and chock assemblies may not provide means for repeatedly and securely coupling the chock to the trolley, and may not have sufficient load bearing capabilities. Accordingly, an improved trolley and chock assembly is desired.

SUMMARY

In one embodiment the present invention is a trolley and chock assembly which includes an attachment mechanism for releasably coupling the chock to the trolley and which provides side access to the attachment mechanism for ease of access and operation. In another embodiment, the present invention is a trolley and chock assembly wherein the chock includes a track opening to provide access to the trolley to ensure that the chock consistently slides along the trolley in a smooth manner. In another embodiment, the present invention is a trolley and chock assembly which includes a retaining pin which is generally fully received in the chock to reduce snag points of the chock and trolley assembly. Finally, in yet another embodiment, the present invention is a trolley and chock assembly which includes a cavity which communicates with a pin opening to reduce clogging of the pin opening to ensure that the chock can be repeatedly and securely coupled to the trolley.

In one embodiment, the invention is a trolley and chock assembly including a trolley and a chock shaped to be slidably coupled to the trolley such that the chock can slide in a sliding direction along the trolley. The chock includes a side opening on a side surface thereof. The trolley and chock assembly further includes an attachment mechanism for releasably coupling the chock to the trolley, and the side opening of the chock provides access to the attachment mechanism in a direction generally perpendicular to the sliding direction.

In another embodiment, the invention is a trolley and chock assembly including a trolley and a chock shaped to be slidably coupled to the trolley such that the chock can slide in a sliding direction along the trolley. The chock is shaped to be releasably attached to the trolley and including a retaining pin extending generally perpendicular to the sliding direction. The retaining pin is shaped and located to receive a retaining belt thereon, the retaining pin being generally received within the chock such that the retaining pin generally does not protrude outwardly from the chock and the chock lacks any fasteners for coupling the retaining pin to the chock that protrude generally outwardly from the chock.

In another embodiment, the invention is a trolley and chock assembly including a trolley and a chock slidably coupled to the trolley such that the chock can slide in a sliding direction along the trolley. The chock includes a side wall oriented generally parallel to the sliding direction, and the chock is shaped to be releasably attached to the trolley. The chock includes at least one track opening in the side wall, and wherein the track opening of the chock provides access to the trolley in a direction generally perpendicular to the sliding direction.

In another embodiment, the invention is a trolley and chock assembly including a trolley, the trolley including a plurality of pin openings, each of the pin openings communicating with at least one cavity. The assembly further includes a chock shaped to be slidably coupled to the trolley such that the chock can slide in a sliding direction along the trolley, the chock including a coupling pin which can be generally closely received in at least one of the pin openings to releasably couple the chock to the trolley. The at least one cavity is generally larger than each of the plurality of pin openings.

Other objects and advantages of the present invention will be apparent from the following description and the accompanying drawings.

DETAILED DESCRIPTION

Figure 1:
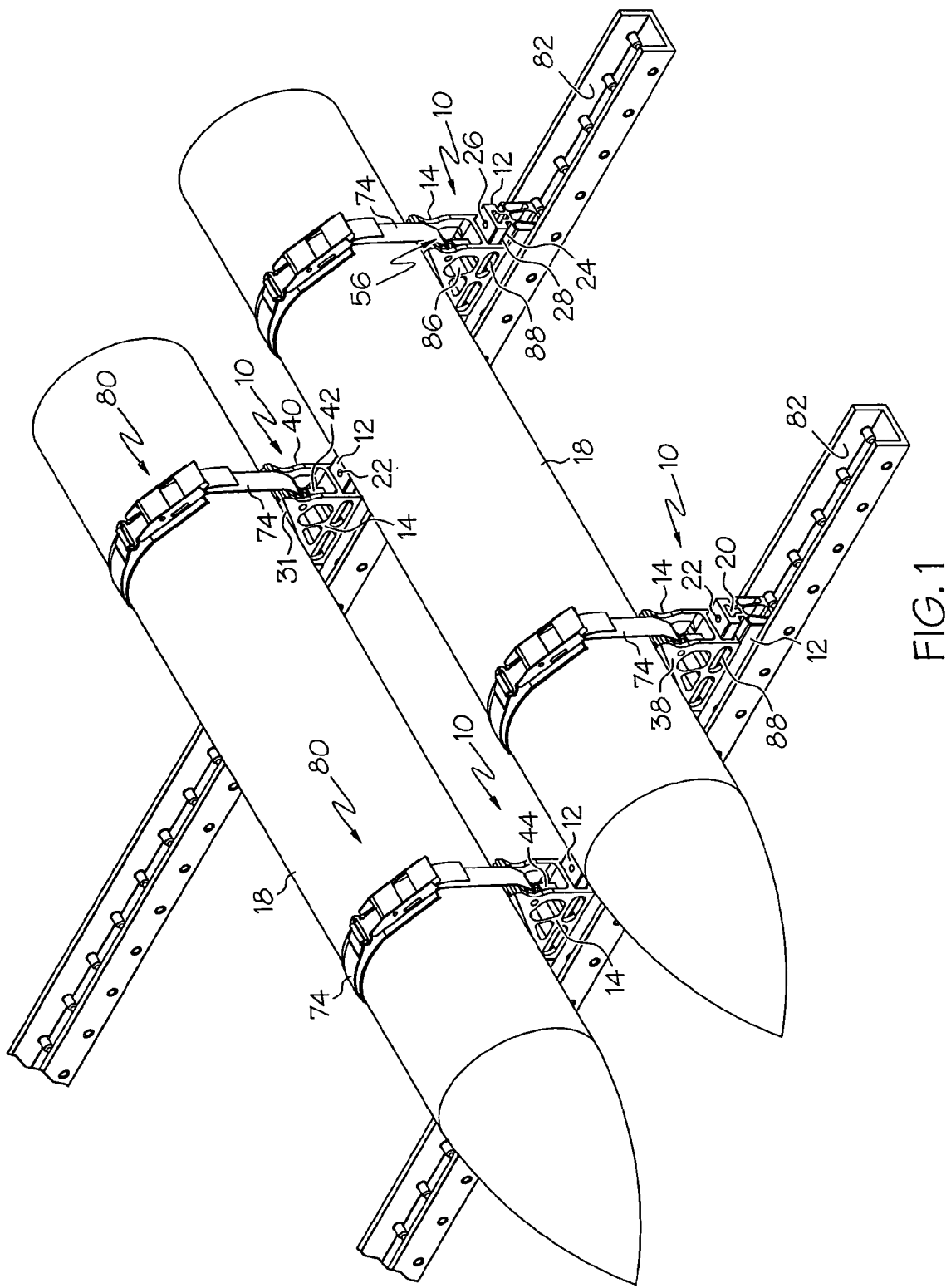
FIG. 1 is a front perspective view of one embodiment of the trolley and chock assembly of the present invention, shown mounted onto a roller rail and receiving munitions thereon.
Figure 2:
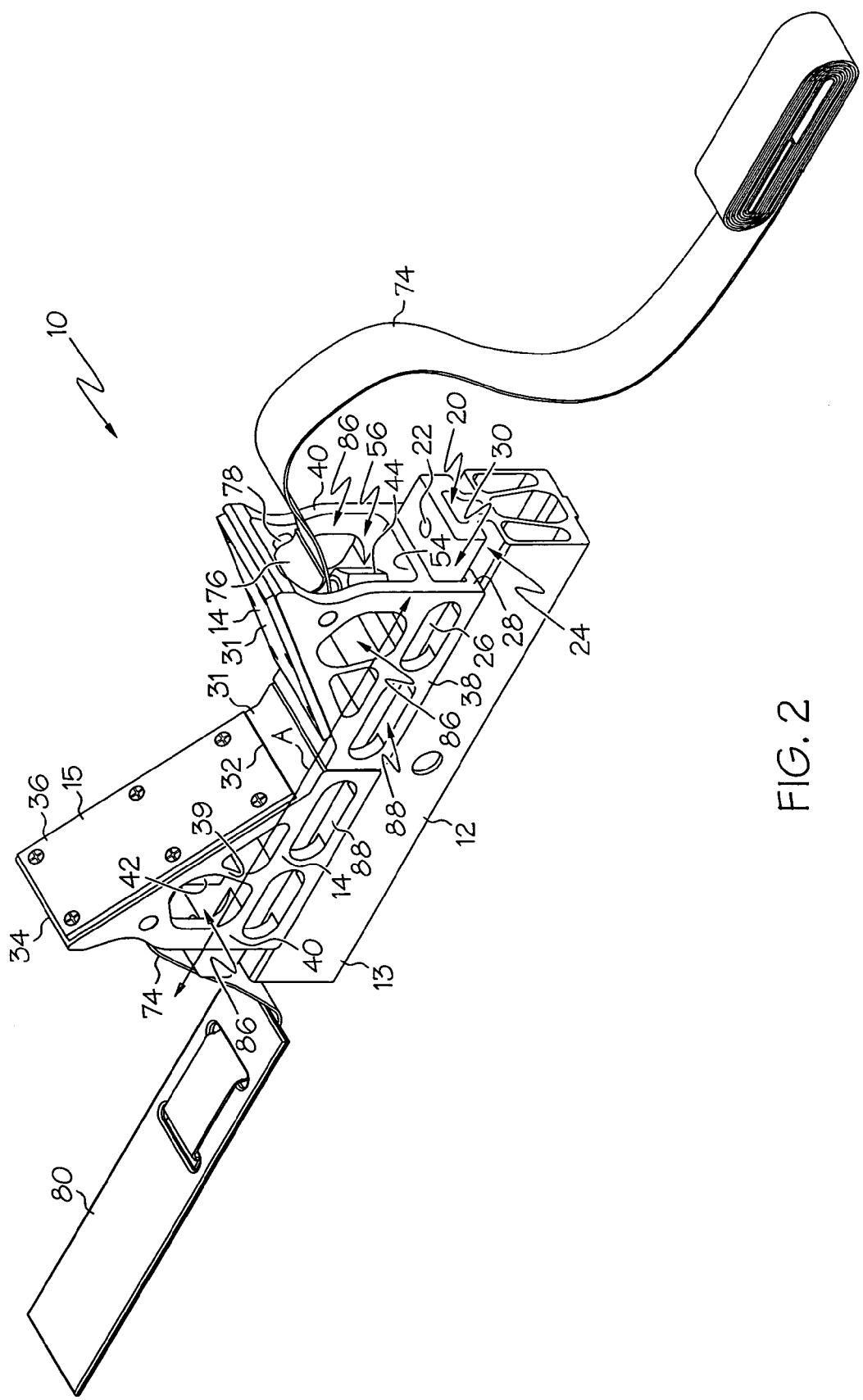
FIG. 2 is a front perspective view of a trolley and chock assembly, shown in a first configuration.

FIG. 1 illustrates a plurality of trolley and chock assemblies 10, each of which includes a trolley 12 and at least one chock 14 slidable along, and releasably coupled to, the associated trolley 12. For example, as shown in FIG. 2, each chock 14 may be slidably coupled to the associated trolley 12 such that each chock can move in a sliding direction or line A. As shown in FIG. 1, the trolley and chock assemblies 10 may be used to store bombs, munitions, missiles or other components 18 which may be generally cylindrical for transportation, storage, or the like.

Figure 4:
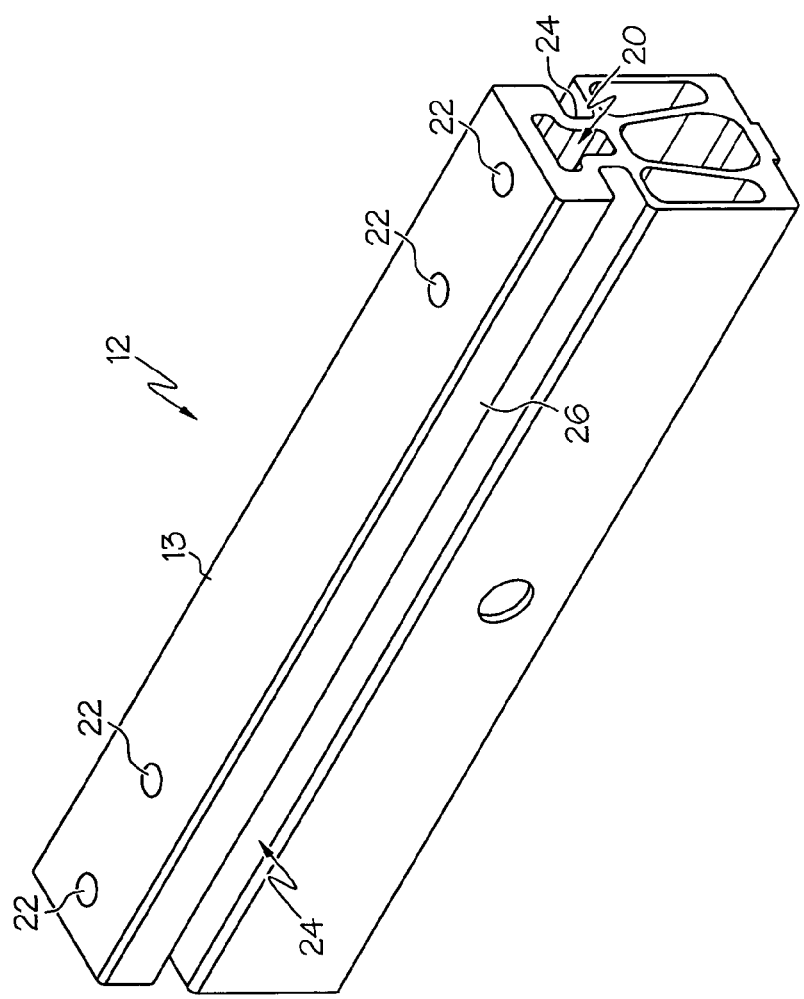
FIG. 4 is a front perspective view of a trolley of the trolley and chock assembly of FIG. 2.
Figure 10:
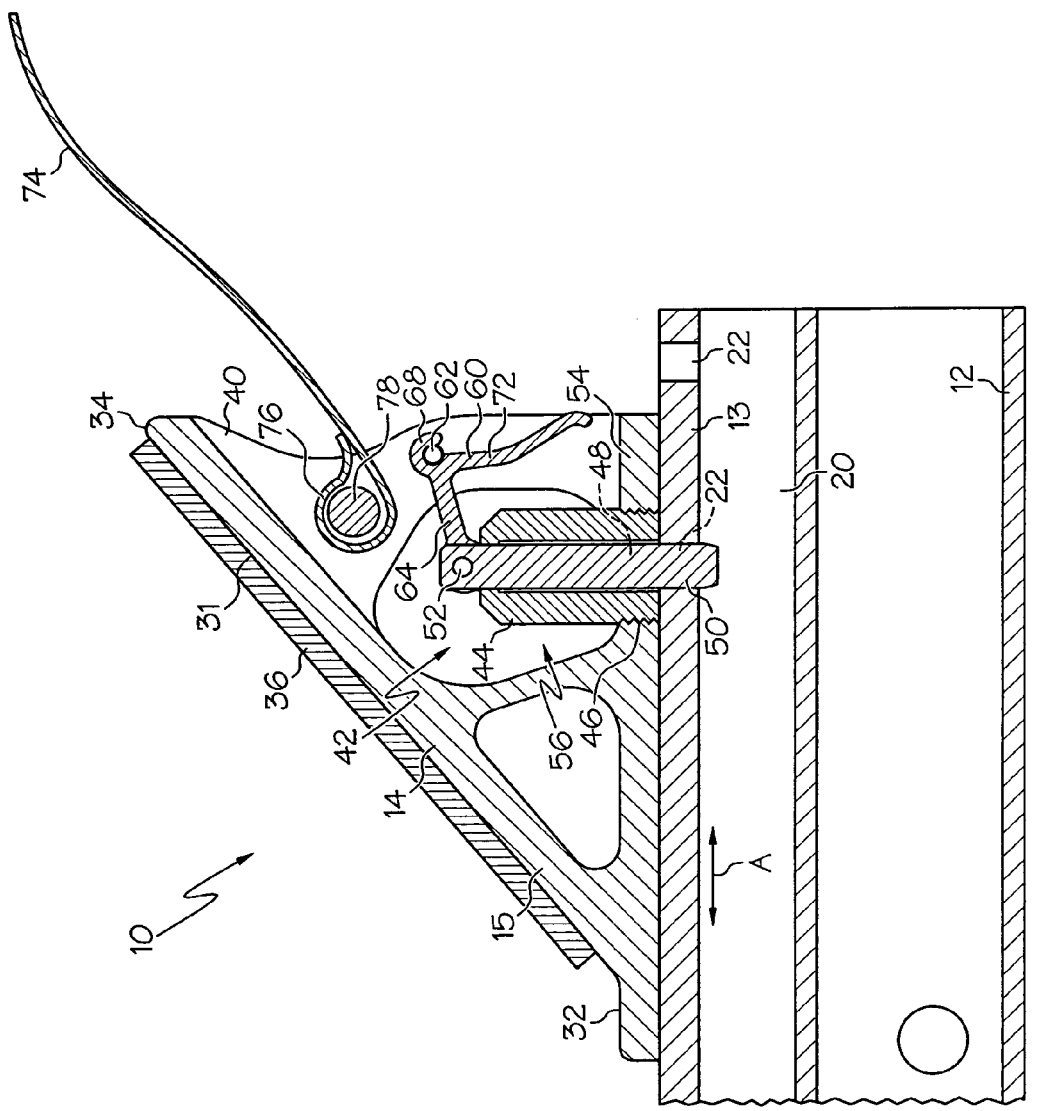
FIG. 10 is a side cross section of the chock of FIG. 9, shown mounted onto a trolley.
Figure 11:
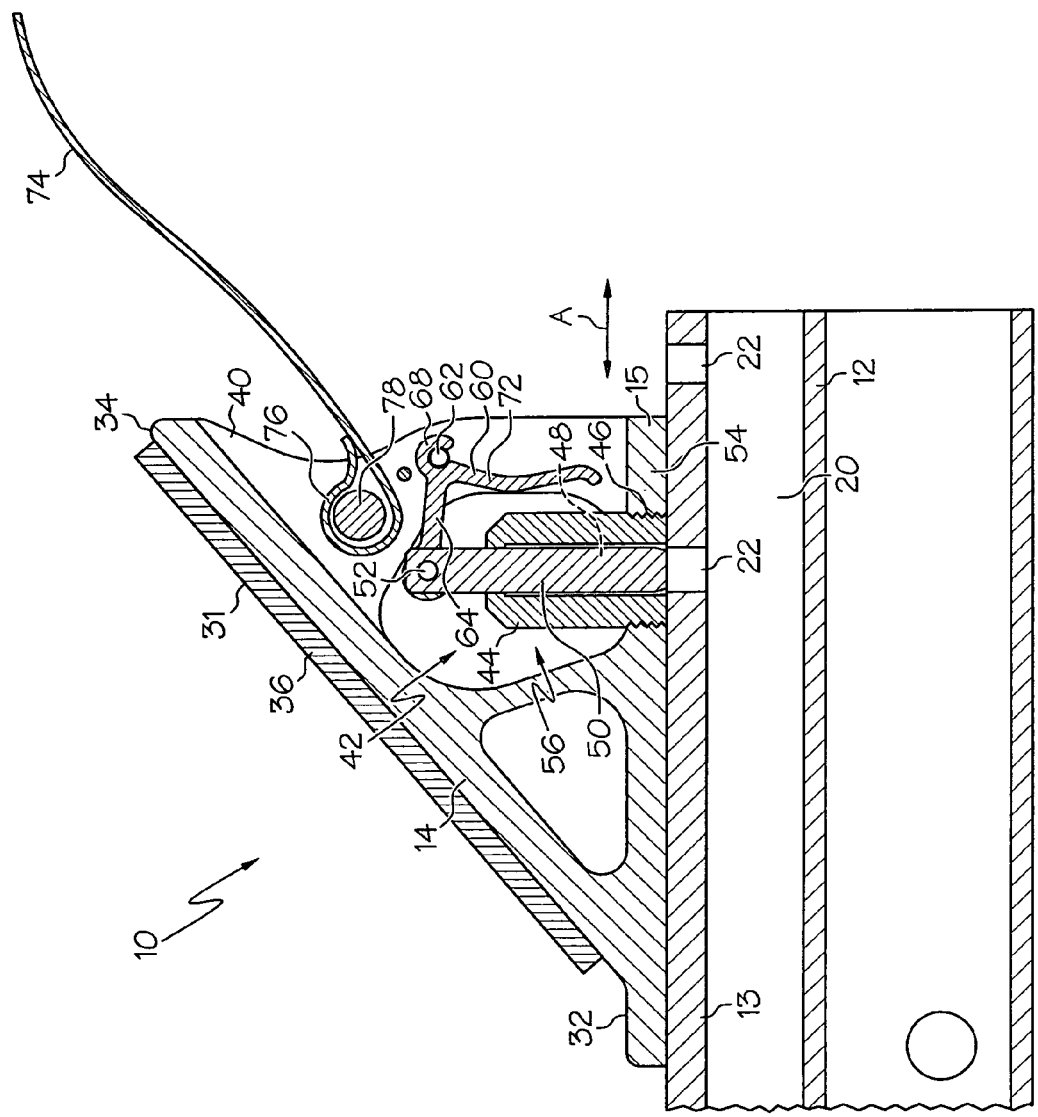
FIG. 11 is a side cross section of the chock and trolley assembly of FIG. 10, with the pin in its retracted position.

As best shown in FIGS. 4, 10 and 11, each trolley 12 may include a trolley body 13 and may be formed in an extruded shape. Each trolley 12 may have an upper cavity 20 extending along the length thereof. Each trolley 12 may include a set of coupling holes 22 located at the outer ends thereof and communicating with the upper cavity 20. Each coupling hole 22 may extend generally vertically, or generally perpendicular to the sliding direction A. Each trolley 12 may further include a pair of opposed longitudinal grooves 24 defining a head or track 26 located above the grooves 24, with the upper cavity 20 located therein.

Figure 3:
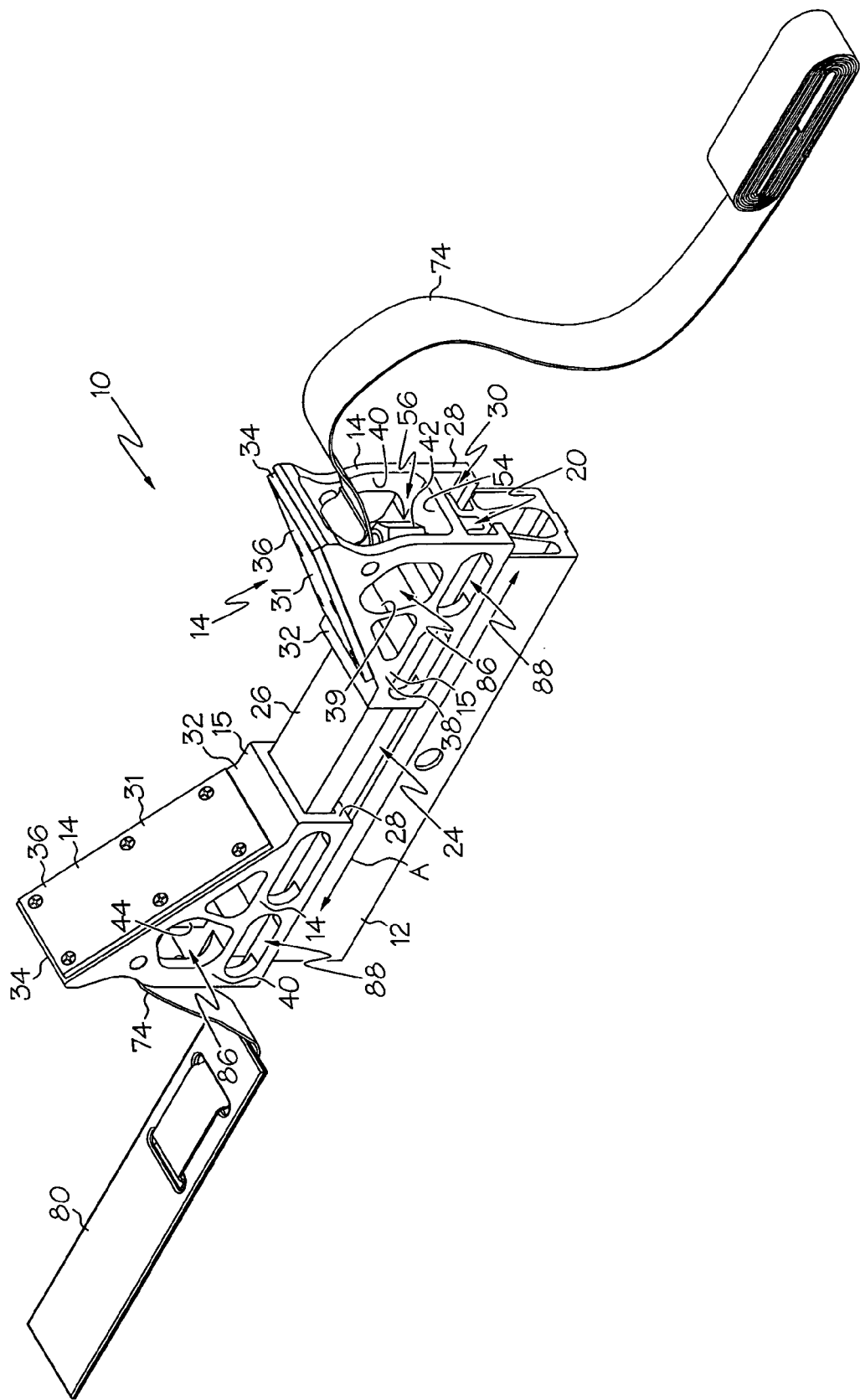
FIG. 3 is a front perspective view of the trolley and chock assembly of FIG. 2, shown in a second configuration.
Figure 5:
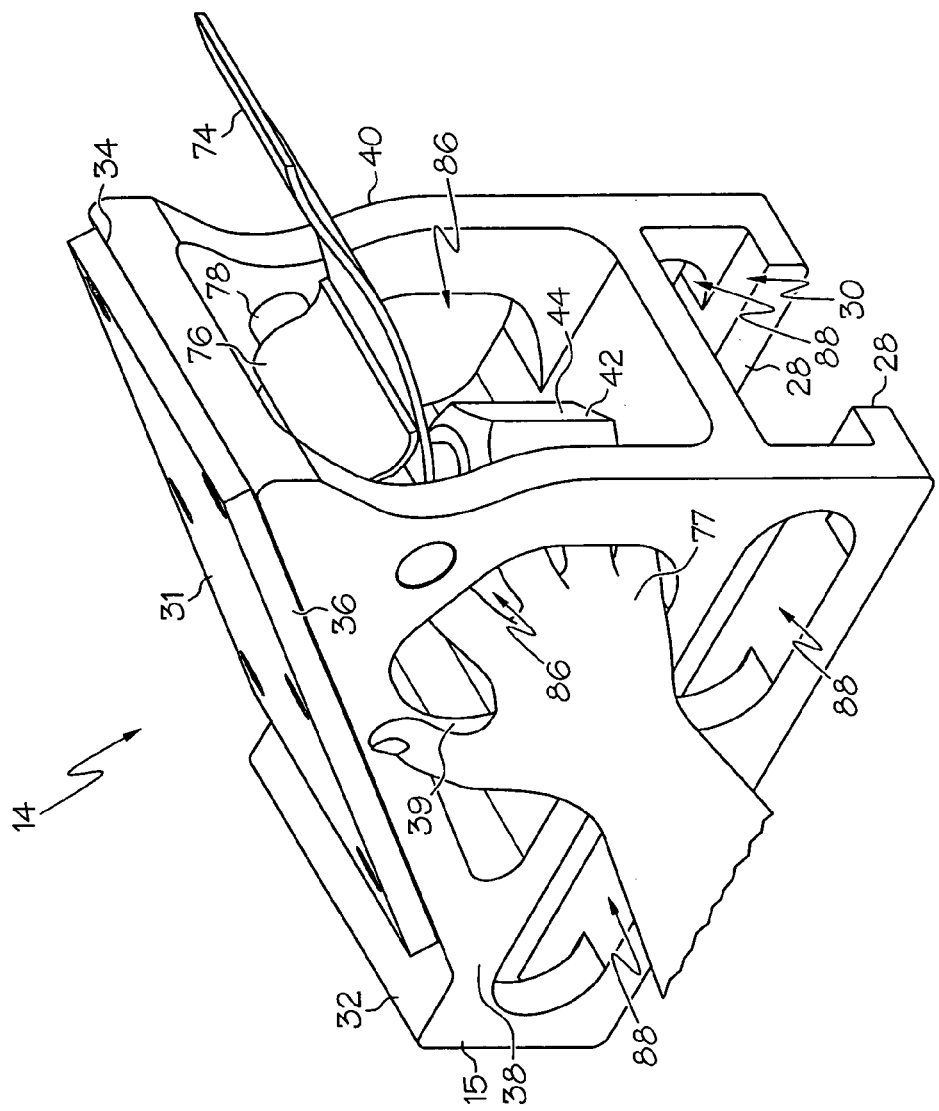
FIG. 5 is a rear perspective view of a chock of the trolley and chock assembly of FIG. 2.
Figure 6:
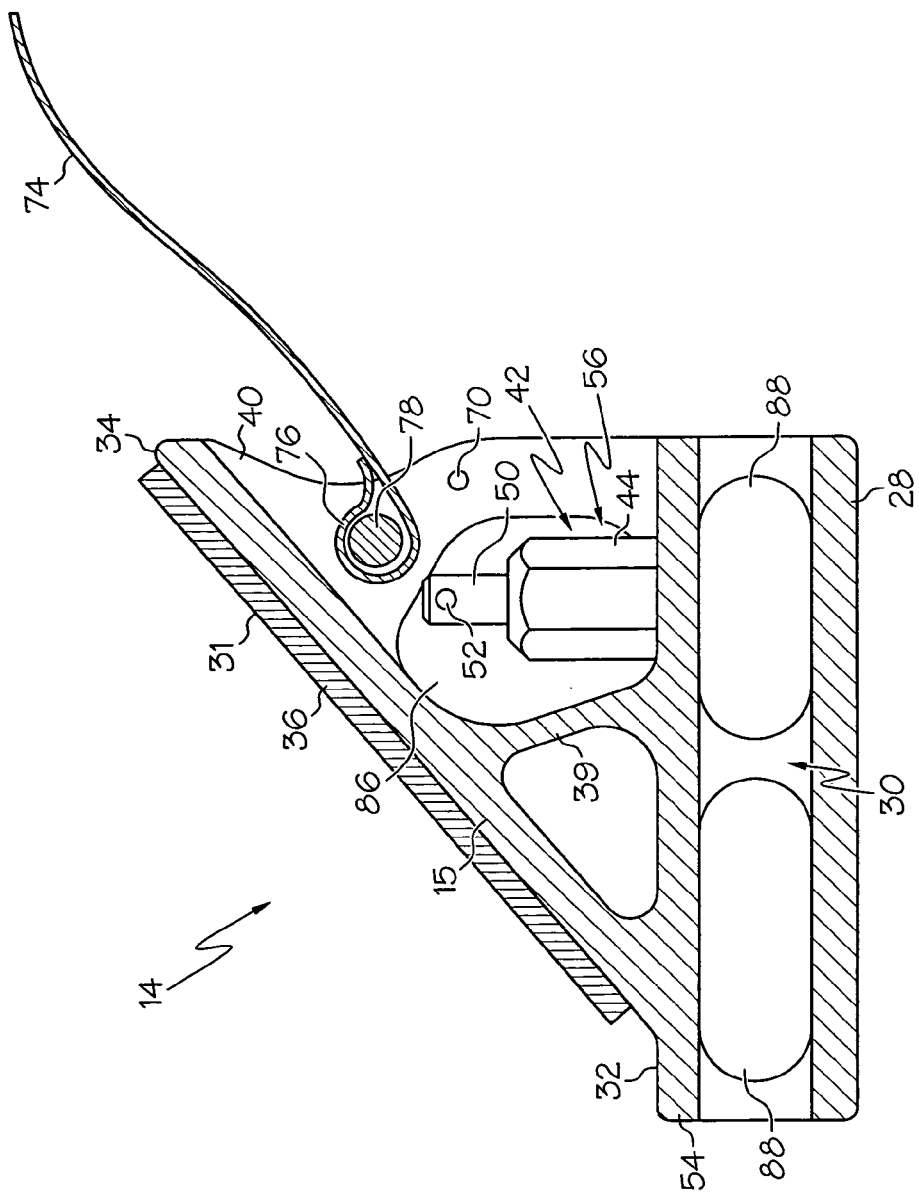
FIG. 6 is a side cross section of the chock of FIG. 2.
Figure 7:
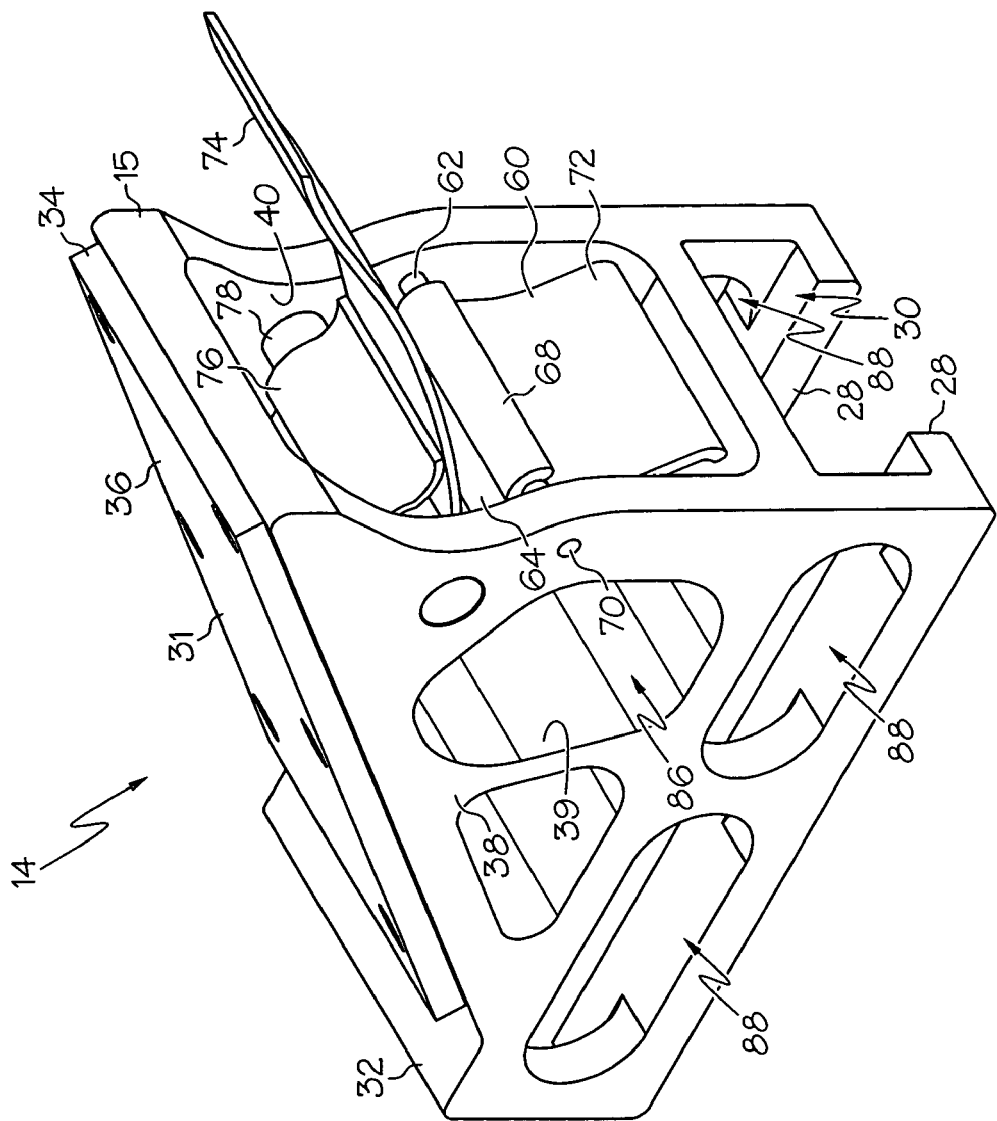
FIG. 7 is a rear perspective view of an alternate chock having a lever arm.

As shown in FIG. 5, each chock 14 may include a chock body 15 and have a pair of inwardly extending flanges 28 defining a lower cavity 30 thereabove which is shaped to receive the track 26 therein. In this manner, as shown in FIGS. 1–3, each chock 14 can be slidably coupled to an associated trolley 12 by sliding the flanges 28 of each chock 14 into the grooves 24 of each trolley 12 such that the head or track 26 of the trolley 12 is received in the lower cavity 30 of the chock 14. The flanges 28, grooves 24, lower cavity 30 and track 26 cooperate to guide sliding motion of the chock 14 in the sliding direction A while generally blocking the chock 14 from moving in a direction generally perpendicular to the track 26 or to the sliding direction A.

Each chock 14 may include a generally flat angled support surface 31 which forms an angle with the sliding direction A. Each support surface 31 may include a lower edge 32 located generally adjacent to the associated trolley 12 and an upper edge 34 generally spaced apart from the associated trolley 12. Each support surface 31 may include or have a piece of soft or cushioned material 36 located thereon. The support surface 31 of a pair of chocks 14 may be configured such that the support surfaces 31 of opposed facing chocks 14 form a generally "V" shape, as best shown in FIG. 2, to receive a cylindrical component 18 thereon or therebetween. Each chock 14 may include a pair of opposed side surfaces or side walls 38, 40 located on either side of the support surface 31. The side walls 38, 40 may be oriented generally parallel to the sliding direction A.

Each chock 14 may include a support web or support flange 39 oriented generally vertically to improve the load bearing characteristics of the chock 14 on the support surface 31. The support flange 39 may extend between the side walls 38, 40 to provide support across the entire width of the support surface 31. The chock 14, and the support flange, 39, may be made of an extruded material, which is relatively strong. In this manner each chock 14 has improved load bearing capacities.

Figure 8:
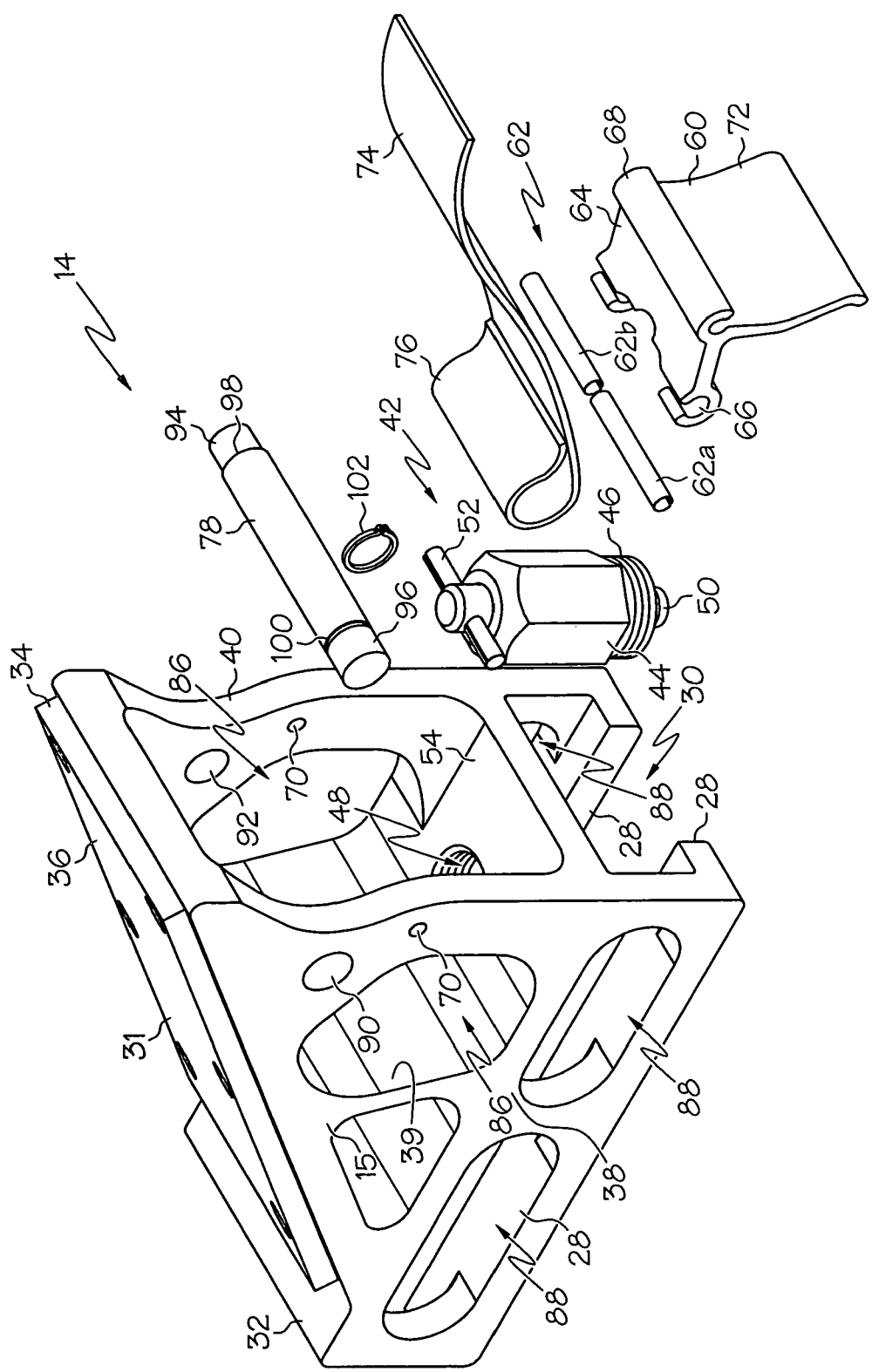
FIG. 8 is an exploded view of the chock of FIG. 7.
Figure 9:
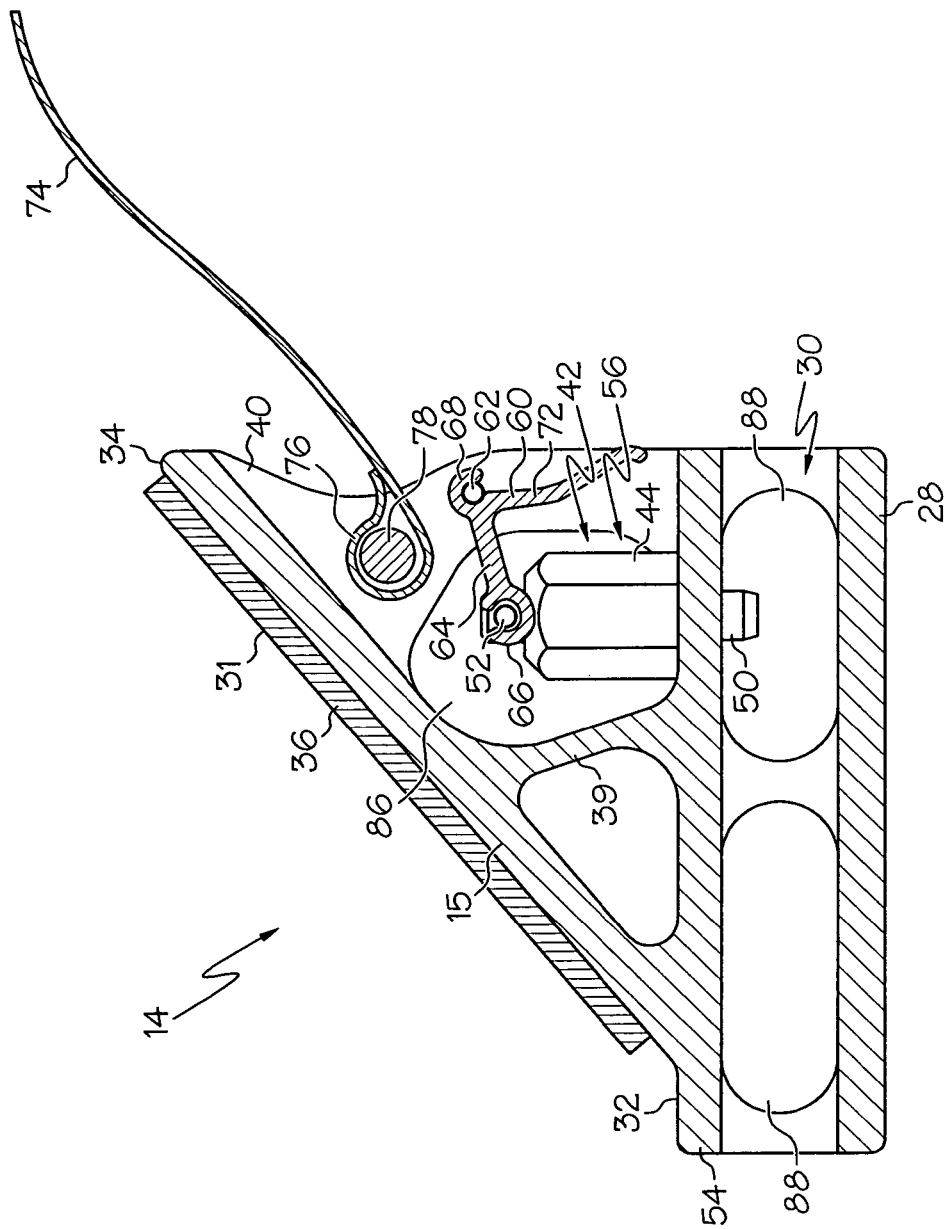
FIG. 9 is a side cross section of the chock of FIG. 7, with the pin in its extended position.

As shown in FIGS. 8, 10 and 11, each chock 14 may include a coupling pin assembly 42 which includes a coupling pin casing 44 which includes a set of male threads 46 which can be threadedly received in a female threaded opening 48 in a bottom surface 54 of the associated chock 14. The pin assembly 42 may include a generally vertically oriented coupling pin 50 and a crossbar 52 extending through an upper end of the coupling pin 50. The coupling pin assembly 46 may include a spring (not shown) or other mechanism located in the coupling pin casing 44 to bias the coupling pin 50 in a downward direction.

The coupling pin 50 is shaped and located to cooperate with the coupling pin openings 22 of the trolley 12 to releasably couple each chock 14 to the trolley 12. For example, each coupling pin 50 is movable between an engaged or extended position (FIG. 10) wherein the coupling pin 50 extends generally downwardly below the bottom surface 54 of the chock 14 and is received in a coupling pin opening 22, and a disengaged or retracted position (FIG. 11) wherein the coupling pin 50 does not protrude below the bottom surface 54 and is retracted out of a coupling pin opening 22. When the coupling pin 50 of a chock 14 is in its retracted position, the chock 14 is free to slide along the trolley 12 until the coupling pin 50 is again received in a coupling pin opening 22. In this manner, the coupling pin 50 and coupling pin openings 22 may form an attachment mechanism 56 for releasably coupling the chock to the trolley.

Each chock 14 may be slidable along the associated track 26 and releasably attachable to the associated trolley 12 in at least two spaced locations, with each spaced location corresponding to a coupling pin opening 22. Movement of the chocks 14 along the trolley 12 allows the trolley and chock assembly 10 to receive components 18 of varying sizes and also allows improved access to the component 18 to be stored thereon. For example, FIG. 2 illustrates each chock 14 releasably coupled to the trolley 12 at an "inside" position wherein each chock 14 is located at or adjacent to inner portions of the trolley 12 and FIG. 3 illustrates each chock 14 attached to the associated trolley 12 at an "outside" position wherein each chock 14 is located at or adjacent to the outer ends of the trolley 12. In this manner, each chock 14 is releasably attachable to the trolley 12 at a plurality of discrete spaced locations. In the embodiment shown herein, the trolley 12 includes two coupling pin openings 22 for each chock 14 such that each chock is releasably attachable to the associated trolley 12 at two spaced locations. However, if desired the trolley 12 may include more or less coupling pin openings 22 so that the chock 14 is attachable to the trolley 12 at any desired number of locations.

The crossbar 52 of the coupling pin 50 provides a convenient mechanism which may be grasped (i.e., by the index and middle fingers of a user with the coupling pin 50 therebetween) to raise the coupling pin 50 to its retracted position. If desired, the chock 14 may include a lever arm 60 that is pivotally mounted to a lever pin 62 which extends between the side walls 38, 40 (see FIGS. 7–11). The lever arm 60 may be an extruded shape and can be made from a variety of materials, including aluminum.

The lever arm 60 includes an inwardly extending extension portion 64 which terminates in a generally circular cross pin section 66 which fits around the cross arm 52 of the coupling pin assembly 42. The lever arm 60 may also include a generally circular pivot pin portion 68 which receives the pivot pin 62 therein. In the embodiment shown in FIG. 8, the pivot pin 62 includes two separable pivot pin portions 62a, 62b, each of which is received in the pivot pin portion 68 and received in a pivot pin opening 70 in the side walls 38, 40. The lever arm 60 may also include a downwardly extending grippable portion 72 which can be gripped by a user and pivoted downwardly (i.e., clockwise about the pivot pin 62 in FIG. 10) to pull the coupling pin 50 to its retracted position (see FIG. 11). In this manner, movement or operation of the lever arm 60 by pivoting the lever arm 60 about the pivot pin 62 causes movement of the coupling pin 50 between its extended and retracted position.

A belt 74 having an end loop 76 may be fixedly coupled to each chock 14. Each chock 12 may include a retaining pin 78 for receiving the end loop 76 of each belt 74 therearound to couple the belt 74 to the chock 14. The retaining pin 78 may extend generally perpendicular to the sliding direction A, and extend between and be coupled to the side walls 38, 40 of the associated chock 14. The free ends of the belts 74 of each pair of chocks 14 of a trolley and chock assembly 10 may be releasably attachable together, such as by a buckle 80 (FIG. 1), ratcheting mechanism or the like.

Each trolley 12 may be slidably received in a roller rail 82 (FIG. 1) such that the trolley can slide within and along the associated roller rail 82. Each trolley 12 can be secured in place along the roller rail 82 by a variety of manners, such as by passing a pin (not shown) through side holes of the roller rails 82 and through aligned holes (not shown) of the trolley 12. Accordingly, when the trolleys 12 and chocks 14 are located in the desired position, the component 18 may be located on or between the opposed angled support surfaces 31 of the chocks 14, the free ends of the belts 74 may be releasably coupled together, such as by the buckle 80 to secure the component 18 to the trolley and chock assembly 10 and thereby to the roller rails 82. The belts 74 and opposed surfaces 31 cooperate such that the components 18 can be securely and fixedly coupled to the chock and trolley assemblies 10.

Each of the side walls 38, 40 may include an upper side opening 86, or attachment mechanism opening, located thereon. The upper side openings 86 provide access to the attachment mechanism 56 in a direction generally perpendicular to the sliding direction A. Each side opening 86 may be sized and located such that a user can manually (i.e. with hand 77; FIG. 5) reach through the side opening 86 in a direction generally perpendicular to the sliding direction A to access and operate the attachment mechanism 56 from the side. In one embodiment, each side opening 86 may have a size of at least about 4 square inches, or at least about 8 square inches, or at least about 16 square inches. In this manner, the side openings 86 on the side walls 38, 40 add two additional routes of access (besides the rear access) to the attachment mechanism 56 so that the user can access and operate the attachment mechanism 56.

For example, access to the attachment mechanism 56 from a rear side of the chocks 14 may be blocked by components or other trolley or chock assemblies 10, or it may simply be difficult, awkward, or inefficient for a user to access the attachment mechanism 56 from the rear side thereof (i.e., in a direction generally parallel to the sliding direction A. Thus, the side openings 86 provide increased flexibility in access to the attachment mechanism 56. Furthermore, the side openings 86 of the chocks 14 provide material savings and reduce the weight of the chocks 14, and are positioned relative to the flange 39 such that the load bearing capability of the chock 14 remains high.

Each side wall 38, 40 may also include a pair of lower openings 88, or track openings, formed therein. As best shown in FIGS. 2 and 3, when a chock 14 is slidably coupled to an associated trolley 12, the track openings 88 expose portions of the track 26 located adjacent to the track openings 88 such that the track 26 of the trolley 12 can be accessed. Because the trolley and chock assembly 10 of the present invention may be used in outdoor, battle, and other extreme conditions (i.e., in arctic, desert, heavily forested environments) loose debris, particles or components may become wedged between the head or track 26 of the trolley 12 and the side walls 38, 40 of the chocks 14. Accordingly, the track openings 88 provide access to the track or head 88 of the trolley 12 so that such debris, particles or components can be accessed and removed, even if the chock 14 should become wedged in place. Thus, the track openings 88 provide access to the track 26 in a direction generally perpendicular to the sliding direction A. Furthermore, the track openings 88 of the chocks 12 provide material savings and reduce the weight of the chock.

As noted earlier, each trolley 12 may include a cavity 20 which communicates with each pin opening 22. The cavity 20 provides a receptacle into which dirt or debris can be pushed if such dirt or debris were to enter one of the pin openings 22. In particular, if the trolley 12 did not include the cavity 20, each of the pin openings 22 could be fully or partially filled with debris, and thereby block the coupling pin 50 from being fully seated in the associated pin opening 22. Furthermore, if a coupling pin 50 were to be only partially seated in a clogged pin opening 22, a user could erroneously assume that the chock 14 is securely coupled to the trolley 12 when the chock 14 is not in fact securely coupled to the trolley 12.

Thus, the cavity 20 may be generally larger (i.e., in volume) than each of the associated pin openings 22. Of course, unlike the pin openings 22, the cavity 20 is not shaped to closely receive a coupling pin 50 therein, and is generally not located to receive a coupling pin 50 therein. Furthermore, the cavity 20 provides material savings and reduces the weight of the trolley.

The retaining pin 78 may be coupled to the chock 14 so that the retaining pin 78 is generally received within the chock 14 (i.e., generally does not protrude beyond the side walls 38, 40) and the chock 14 may lack any fasteners for coupling the retaining pin 78 to the chock 14 that protrudes generally outwardly from the chock 14. For example, as shown in FIG. 8, side wall 38 may include a retaining pin opening 90 formed therethrough and side wall 40 may include a retaining pin opening 92 formed therethrough. Retaining pin opening 92 is smaller than retaining pin opening 90.

The retaining pin 78 may have a reduced diameter end 94 and a retaining ring end 96. The reduced diameter end 94 has a diameter that is smaller than the diameter of the retaining pin opening 92, and defines a shoulder 98 having a diameter that is greater than the diameter of the retaining pin opening 92 but smaller than the diameter of the retaining pin opening 90. The retaining ring end 96 of the retaining pin 78 has a diameter that is smaller than the retaining pin opening 90, and has and a circumferential groove 100 formed therein or located adjacent thereto.

Figure 12:
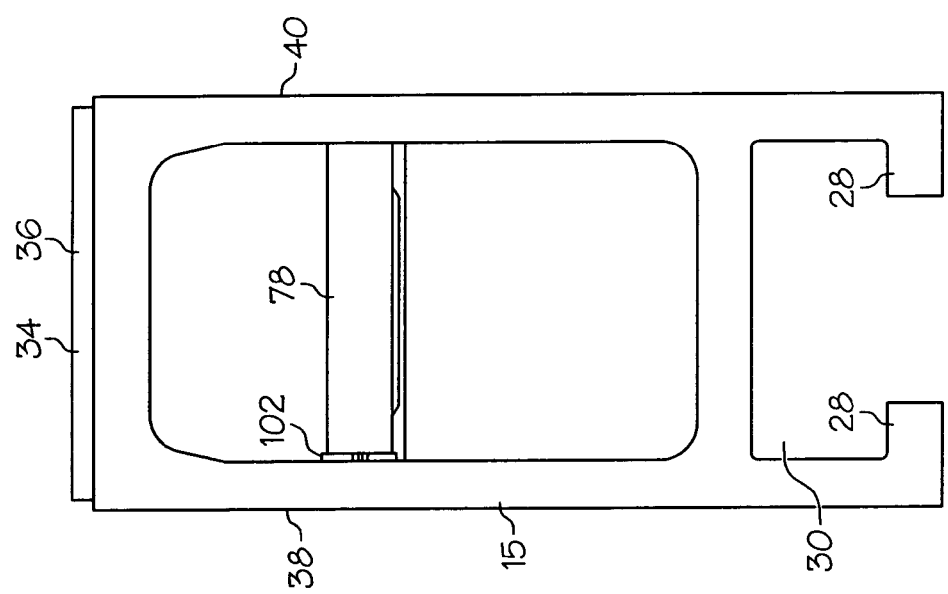
FIG. 12 is a rear end view of the chock of FIG. 5, shown without the coupling pin assembly.

In order to couple the retaining pin 78 to the chock 14, the reduced diameter end 94 of the retaining pin 78 is passed through retaining pin opening 90 and into the body of the chock 14. The retaining pin 78 is then pushed through the end loop 76 of the belt 74 and the retaining pin opening 90 until the reduced diameter end 94 is received in the retaining pin opening 92 and the retaining ring end 96 is generally passed through the retaining pin opening 90. In this configuration the shoulder 94 abuts against the side wall 40 to prevent the retaining pin 78 from passing through the retaining pin opening 92. Next a locking ring 102 is fit into the groove 100 such that when the locking ring 102 is received in the groove 100 the locking ring 102 has a diameter greater than that of the retaining pin opening 90. Thus, as shown in FIG. 12, the locking ring 102 is located adjacent to the side wall 38 to prevent the retaining pin 78 from being pulled out of the chock 14. When the retaining pin 78 is locked in place, its ends may be generally flush with, or generally recessed inwardly from, or protruding only slightly outwardly from, the side walls 38, 40.

If it is desired to remove the retaining pin 78, a specialized pair of retaining ring pliers, which are well known in the art, may be utilized to expand the locking ring 102 and remove the locking ring 102 from the groove 100 and retaining pin 78. The retaining pin 78 can then be retracted through the retaining pin opening 90. Thus, the retaining pin 78/locking ring 102 provides a quick and easy method and mechanism for attaching the retaining pin 78 and belt 74 to the chock 14, while also reducing external snag points of the chock 14. The retaining pin 78 may be made from a variety of materials, including aluminum.

The trolley 12 and chocks 14 may be made from a wide variety of materials. In one case the trolley 12 and chocks 14 are made of aluminum, such as alloy 6036-T6 aluminum. If desired, the trolley 12 and chocks 14 may be painted with a powdercoat process, such as by anodizing the trolley 12 and chocks 14 in a two-step process which uses a non-fading, inorganic pigment. The track 26 of the trolley 12 may be masked during the powdercoat and anodizing process such that the track 26 does not get painted. After deposition and curing of the powdercoat a clearcoat may then be applied.

Having described the invention in detail and by reference to the preferred embodiments, it will be apparent that modifications and variations thereof are possible without departing from the scope of the invention.

What is claimed is:

1. A trolley and chock assembly comprising:
   a trolley;
   a chock shaped to be slidably coupled to said trolley such that said chock can slide in a sliding direction along said trolley, said chock including a side opening on a side surface thereof and including an angled support surface which forms an angle with respect to said sliding direction; and
   an attachment mechanism for releasably coupling said chock to said trolley, where said side opening of said chock provides access to said attachment mechanism in a direction generally perpendicular to said sliding direction.

2. The assembly of claim 1 wherein said chock includes a flat support surface located generally above said trolley, said support surface forming an angle with said sliding direction and being shaped to receive a component thereon, said support surface having a lower edge located generally adjacent to said trolley and an upper edge generally spaced apart from said trolley.

3. The assembly of claim 1 wherein said assembly further includes a supplemental chock slidably coupled to said trolley and being releasably attachable to said trolley.

4. The assembly of claim 3 wherein said supplemental chock includes an angled support surface which forms an angle with respect to said sliding direction, wherein said chock and said supplemental chock can be slidably coupled to said trolley such that said angled support surfaces generally face each other to form a generally "V" shape such that a component can be located between and supported by said support surfaces.

5. The assembly of claim 4 further comprising the component located between and supported by said support surfaces.

6. The assembly of claim 1 wherein said chock includes at least one side wall oriented generally parallel to said sliding direction, and wherein said side wall at least partially defines said side surface.

7. The assembly of claim 6 wherein said side opening is sized and located such that a user can manually reach through said side opening in a direction generally perpendicular to said sliding direction to access and operate said attachment mechanism.

8. The assembly of claim 1 wherein at least part of said attachment mechanism is located on said chock and at least part of said attachment mechanism is located on said trolley.

9. The assembly of claim 1 wherein said attachment mechanism includes a coupling pin located on said chock and a plurality of pin openings located on said trolley, and wherein said coupling pin can be received in at least one of said pin openings to releasably couple said chock to said trolley.

10. The assembly of claim 9 wherein said coupling pin is oriented generally perpendicular to said sliding direction.

11. The assembly of claim 9 wherein said coupling pin can be generally closely received in at least one of said pin openings to releasably couple said chock to said trolley, and wherein said trolley includes a cavity which communicates with at least one of said pin openings.

12. The assembly of claim 11 wherein said cavity is generally larger than each of said plurality of pin openings.

13. The assembly of claim 9 further comprising a lever arm operatively coupled to said coupling pin such that movement of said lever arm causes movement of said coupling pin into or out of one of said pin openings.

14. The assembly of claim 1 wherein said chock is slidably coupled to said trolley.

15. The assembly of claim 1 wherein said chock is releasably attachable to said trolley by said attachment mechanism at a plurality of discreet spaced locations.

16. The assembly of claim 1 wherein said trolley includes a track and said chock is shaped to slidably receive said track therein.

17. The assembly of claim 16 wherein said chock includes at least one side wall oriented generally parallel to said sliding direction, and wherein said chock including at least one track opening in said side wall, and wherein said track opening provides access to said track in a direction generally perpendicular to said sliding direction.

18. The assembly of claim 1 wherein said chock includes a retaining pin extending generally perpendicular to said sliding direction and to said side surface, said retaining pin being shaped and located to receive a retaining belt thereon.

19. The assembly of claim 18 wherein retaining pin is generally received within said chock such that said retaining pin generally does not protrude outwardly from said chock and said chock lacks any fasteners for coupling said retaining pin to said chock that protrude generally outwardly from said chock.

20. The assembly of claim 1 wherein said angled support surface defines a plane that intersects a line defined by said sliding direction.

21. A trolley and chock assembly comprising:
    a trolley; and
    a chock shaped to be slidably coupled to said trolley such that said chock can slide in a sliding direction along said trolley, said chock being shaped to be releasably attached to said trolley, said chock including a retaining pin extending generally perpendicular to said sliding direction, said retaining pin being shaped and located to receive a retaining belt thereon, said retaining pin being generally received within said chock such that said retaining pin generally does not protrude outwardly from said chock and said chock lacks any fasteners for coupling said retaining pin to said chock that protrude generally outwardly from said chock.

22. The assembly of claim 21 wherein said chock includes a pair of opposed side walls oriented generally parallel to said sliding direction, and wherein said retaining pin is oriented generally perpendicular to said opposed side walls.

23. The assembly of claim 22 wherein said retaining pin includes a reduced diameter end and a retaining ring end having a circumferential groove located adjacent thereto.

24. The assembly of claim 23 wherein said reduced diameter end is closely received in one of said side walls and said circumferential groove is located adjacent to the other one of said side walls, and wherein a retaining ring is received in said circumferential groove.

25. The assembly of claim 21 wherein said chock includes a pair of opposed side walls oriented generally parallel to said sliding direction and wherein said chock includes a side opening on one of said side walls and wherein said assembly includes an attachment mechanism for releasably coupling said chock to said trolley, wherein said side opening provides access to said attachment mechanism in a direction generally perpendicular to said sliding direction.

26. The assembly of claim 21 wherein said assembly includes an attachment mechanism for releasably attaching said chock to said trolley, and wherein said attaching mechanism includes a coupling pin located on said chock and a plurality of pin openings located on said trolley, and wherein said coupling pin can be received in at least one of said pin openings to releasably couple said chock to said trolley.

27. The assembly of claim 21 wherein said trolley includes a track and said chock is shaped to slidably receive said track therein.

28. The assembly of claim 27 wherein said chock includes a side opening having at least one track opening located therein, and wherein said track opening of said chock provides access to said track in a direction generally perpendicular to said sliding direction.

29. The assembly of claim 27 wherein said chock includes a flat support surface located generally above said trolley, said support surface forming an angle with said sliding direction and being shaped to receive a component thereon, said support surface having a lower edge located generally adjacent to said trolley and an upper edge generally spaced apart from said trolley.

30. The assembly of claim 27 wherein said assembly farther includes a supplemental chock slidably coupled to said trolley and releasably attachable to said trolley.

31. The assembly of claim 30 wherein said chock and said supplemental chock each includes an angled support surface which forms an angle with respect to said sliding direction, wherein said chock and said supplemental chock can be slidably coupled to said trolley such that said angled support surfaces generally face each other to form a generally "V" shape such that a component can be located between and supported by said support surfaces.

32. The assembly of claim 21 wherein said chock is releasably attachable to said trolley at a plurality of discreet spaced locations.

33. The assembly of claim 21 wherein said chock includes a pair of opposed side walls oriented generally parallel to said sliding direction and wherein said retaining pin generally extends between said side walls.

34. A trolley and chock assembly comprising:
a trolley; and
a chock slidably coupled to said trolley such that said chock can slide in a sliding direction along said trolley, said chock including a side wall oriented generally parallel to said sliding direction, said chock being shaped to be releasably attached to said trolley, said chock including at least one track opening in said side wall, and wherein said track opening of said chock provides access to said trolley in a direction generally perpendicular to said sliding direction.

35. The assembly of claim 34 wherein said chock includes a side opening on said side wall thereof and wherein said assembly includes an attachment mechanism for releasably coupling said chock to said trolley, wherein said side opening provides access to said attachment mechanism in a direction generally perpendicular to said sliding direction.

36. The assembly of claim 34 wherein said assembly includes an attachment mechanism for releasably attaching said chock to said trolley, and wherein said attaching mechanism includes a coupling pin located on said chock and a plurality of pin openings located on said trolley, and wherein said coupling pin can be received in at least one of said pin openings to releasably couple said chock to said trolley.

37. The assembly of claim 36 wherein said coupling pin can be generally closely received in at least one of said pin openings to releasably couple said chock to said trolley, and wherein said trolley includes a cavity which communicates with at least one of said pin openings.

38. The assembly of claim 34 wherein said chock includes a retaining pin extending generally perpendicular to said sliding direction, said retaining pin being shaped and located to receive a retaining belt thereon.

39. The assembly of claim 38 wherein said retaining pin is generally received within said chock such that said retaining pin generally does not protrude outwardly from said chock and said chock lacks any fasteners for coupling said retaining pin to said chock that protrude generally outwardly from said chock.

40. The assembly of claim 34 wherein said chock includes a flat support surface located generally above said trolley, said support surface forming an angle with said sliding direction and being shaped to receive a component thereon, said support surface having a lower edge located generally adjacent to said trolley and an upper edge generally spaced apart from said trolley.

41. The assembly of claim 34 wherein said assembly further includes a supplemental chock slidably coupled to said trolley and being releasably attachable to said trolley.

42. The assembly of claim 41 wherein said chock and said supplemental chock each includes an angled support surface which forms an angle with respect to said sliding direction, said angled support surfaces generally facing each other to form a generally "V" shape such that a component can be located between and supported by said support surfaces.

43. The assembly of claim 34 wherein said chock is releasably attachable to said trolley at a plurality of discreet spaced locations.

44. The assembly of claim 34 wherein said chock is shaped to slidably receive at least part of said trolley therein such that said chock can generally slide along the length of said trolley in said sliding direction but is generally blocked from moving in a direction generally perpendicular to said trolley.

45. The assembly of claim 34 wherein said trolley includes a pair of opposed grooves and said trolley includes a pair of opposed flanges, each flange being shaped to be received in an associated one of said grooves to slidably couple said trolly and said chock.

46. The assembly of claim 45 wherein said trolley includes a head located generally above said opposed grooves, and wherein said at least one track opening is located generally above said grooves such that when said trolley is coupled to said trolley said at least one track opening exposes at least part of said head.

47. A trolley and chock assembly comprising;
a trolley, said trolley including a plurality of pin openings, each of said pin openings communicating with at least one cavity; and
a chock shaped to be slidably coupled to said trolley such that said chock can slide in a sliding direction along said trolley, said chock including an angled support surface which forms an angle with respect to said sliding direction, said chock further including a coupling pin oriented generally perpendicular to said sliding direction and which can be generally closely received in at least one of said pin openings to releasably couple said chock to said trolley, and wherein said at least one cavity is generally larger than each of said plurality of pin openings.

48. The assembly of claim 47 wherein each pin opening is shaped and located to closely receive said coupling pin therein, and wherein said cavity is not shaped to closely receive said coupling pin therein or is generally not located to receive said coupling pin therein.

49. The assembly of claim 47 wherein said cavity extends generally the entire length of said trolley.

50. The assembly of claim 47 wherein said chock includes a pair of opposed side walls oriented generally parallel to said sliding direction and wherein said chock includes a side opening on one of said side walls and wherein said assembly includes an attachment mechanism for releasably coupling said chock to said trolley, wherein said side opening provides access to said attachment mechanism in a direction generally perpendicular to said sliding direction.

51. The assembly of claim 47 wherein said trolley includes a track and said chock is shaped to slidably receive said track therein.

52. The assembly of claim 50 wherein said chock includes at least one track opening in said side wall, and wherein said track opening of said chock provides access to said trolley in a direction generally perpendicular to said sliding direction.

53. The assembly of claim 47 wherein said chock includes a retaining pin extending generally perpendicular to said sliding direction, said retaining pin being shaped and located to receive a retaining belt thereon.

54. The assembly of claim 47 wherein said retaining pin is generally received within said chock such that said retaining pin generally does not protrude outwardly from said chock and said chock lacks any fasteners for coupling said retaining pin to said chock that protrude generally outwardly from said chock.

55. The assembly of claim 47 wherein said chock includes a flat support surface located generally above said trolley, said support surface and being shaped to receive a component thereon, said support surface having a lower edge located generally adjacent to said trolley and an upper edge generally spaced apart from said trolley.

56. The assembly of claim 47 wherein said assembly further includes a supplemental chock slidably coupled to said trolley and being releasably attachable to said trolley.

57. The assembly of claim 56 wherein said supplemental chock includes an angled support surface which forms an angle with respect to said sliding direction, said angled support surfaces generally facing each other to form a generally "V" shape such that a component can be located between and supported by said support surfaces.

58. The assembly of claim 47 wherein said chock is releasably attachable to said trolley at a plurality of discreet spaced locations.

59. The assembly of claim 47 wherein said chock is shaped to slidably receive at least part of said trolley therein such that said chock can generally slide along the length of said trolley in said sliding direction but is generally blocked from moving in a direction generally perpendicular to said trolley.

60. The assembly of claim 47 wherein said chock includes a pair of opposed side walls oriented generally parallel to said sliding direction, and wherein said coupling pin is oriented generally perpendicular to said opposed side walls such that said coupling pin is oriented generally vertically when said chock is slidably coupled to said trolley.

61. The assembly of claim 47 wherein said coupling pin includes a longitudinal axis and wherein said coupling pin is movable along said longitudinal axis.

62. The assembly of claim 61 wherein said coupling pin is movable between an extended position, wherein said coupling pin extends generally below a bottom surface of said chock, and a retracted position wherein said coupling pin does not extend generally below said bottom surface.

63. The assembly of claim 47 wherein said angled support surface defines a plane that intersects a line defined by said sliding direction.

64. The assembly of claim 47 further including includes a supplemental chock slidably coupled to said trolley and being releasably attachable to said trolley, and wherein said supplemental chock includes an angled support surface which forms an angle with respect to said sliding direction, wherein said chock and said supplemental chock can be slidably coupled to said trolley such that said angled support surfaces generally face each other to form a generally "V" shape such that a component can be located between and supported by said support surface.

65. A method for moving a chock along a trolley comprising the steps of:
providing a trolley and chock assembly including a trolley, a chock slidably coupled to said trolley such that said chock can slide in a sliding direction along said trolley, said chock including a side opening on a side surface thereof and an attachment mechanism releasably coupling said chock to said trolley;
reaching through said side opening of said chock to access said attachment mechanism in a direction generally perpendicular to said sliding direction;
operating said attachment mechanism to release said attachment mechanism; and
sliding said chock along said trolley.

66. A chock comprising:
a chock body having a lower cavity extending generally in a sliding direction, said lower cavity being shaped to be slidably coupled to a trolley such that said chock can slide in said sliding direction along said trolley, said chock including a side opening on a side surface thereof, and
an attachment mechanism located on said chock body for releasably coupling said chock to said trolley, wherein said side opening of said chock is sized and located to provide manual access to said attachment mechanism in a direction generally perpendicular to said sliding direction.

67. A chock including:
a chock body having a lower cavity extending generally in a sliding direction, said lower cavity being shaped to be slidably coupled to a trolley such that said chock can slide in said sliding direction along said trolley, said chock being shaped to be releasably attached to said trolley and including a retaining pin extending generally perpendicular to said sliding direction, said retaining pin being shaped and located to receive a retaining belt thereon, said retaining pin being generally received within said chock such that said retaining pin generally does not protrude outwardly from said chock and said chock lacks any fasteners for coupling said retaining pin to said chock that protrude generally outwardly from said chock.

68. A chock comprising: a chock body having a lower cavity extending generally in a sliding direction, said lower cavity being shaped to be slidably coupled to a trolley such that said chock can slide in said sliding direction along said trolley, said chock including a side wall oriented generally parallel to said sliding direction, said chock being shape to be releasably attached to said trolley, said chock including at least one track opening in said side wall, and wherein said tracik opening of said chock provides access to said lower cavity in a direction generally perpendicular to said sliding direction.

69. A method for coupling a chock and a trolley comprising the steps of:
providing a trolley and chock assembly including a trolley including a plurality of pin openings, each of said pin openings communicating with at least one cavity, said at least one cavity being generally larger than each of said plurality of pin openings, said trolley and chock assembly further including a chock slidably coupled to said trolley such that said chock can slide in a sliding direction along said trolley, said chock including an angled support surface which forms an angle with respect to said sliding direction, said chock including a coupling pin; and
moving said coupling pin such that said coupling pin is generally closely received in and generally passed through one of said pin openings and a distal end of said coupling pin is received in the cavity to releasably couple said chock to said trolley.

70. The method of claim 69 wherein said angled support surface defines a plane that intersects a line defined by said sliding direction.

71. The method of claim 69 wherein said trolly and chock assembly further includes a supplemental chock slidably coupled to said trolley and being releasably attachable to said trolley, and wherein said supplemental chock includes an angled support surface which forms an angle with respect to said sliding direction, wherein said chock and said supplemental chock can be slidably coupled to said trolley such that said angled support surfaces generally face each other to form a generally "V" shape such that a component can be located between and supported by said support surfaces.

72. A trolley including:
a trolley body including a generally longitudinally extending track and being shaped to slidably receive a chock thereon, said trolley including a generally longitudinally extending cavity and including a plurality of discreet spaced-apart pin openings oriented generally perpendicular to the track and communicating with said cavity.

73. The trolley of claim 72 wherein each of said pin openings are generally circular in top view.

* * * * *

UNITED STATES PATENT AND TRADEMARK OFFICE
CERTIFICATE OF CORRECTION

PATENT NO. : 6,971,826 B2
DATED : December 6, 2005
INVENTOR(S) : Heath E. Valentine It is certified that error appears in the above-identified patent and that said Letters Patent is hereby corrected as shown below:

Column 7,
Line 25, change "where" to -- wherein --.

Column 9,
Line 32, change "farther" to -- further --.

Column 11,
Line 32, change "47" to -- 53 --.

Column 12,
Line 21, change "surface" to -- surfaces --.
Line 64, after ":" return and start a new line beginning with "a chock".

Signed and Sealed this

Twenty-first Day of February, 2006

JON W. DUDAS
*Director of the United States Patent and Trademark Office*